(12) United States Patent
Singer et al.

(10) Patent No.: US 10,609,481 B2
(45) Date of Patent: Mar. 31, 2020

(54) ELECTRIC OVERCURRENT PROTECTION SYSTEM AND METHOD

(71) Applicant: GM GLOBAL TECHNOLOGY OPERATIONS LLC, Detroit, MI (US)

(72) Inventors: Ian R. Singer, Macomb, MI (US); Richard A. Close, Farmington Hills, MI (US); Runhong Deng, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 70 days.

(21) Appl. No.: 16/003,656

(22) Filed: Jun. 8, 2018

(65) Prior Publication Data

US 2019/0379971 A1    Dec. 12, 2019

(51) Int. Cl.
*H04R 3/00* (2006.01)
*H02H 3/08* (2006.01)

(52) U.S. Cl.
CPC .............. *H04R 3/007* (2013.01); *H02H 3/08* (2013.01)

(58) Field of Classification Search
CPC .................................. H04R 3/007; H02H 3/08
USPC ........ 381/55, 150, 123, 86; 257/173; 73/647
See application file for complete search history.

(56) References Cited

U.S. PATENT DOCUMENTS

| | | | | |
|---|---|---|---|---|
| 4,425,517 A | * | 1/1984 | Smith | H03K 19/007 326/14 |
| 5,274,838 A | * | 12/1993 | Childress | H04W 84/08 455/17 |
| 5,384,697 A | * | 1/1995 | Pascucci | G06F 9/465 700/10 |
| 2011/0304400 A1 | * | 12/2011 | Stanley | H03F 1/26 330/295 |
| 2013/0083928 A1 | * | 4/2013 | Williams | H03G 7/002 381/55 |
| 2016/0124400 A1 | * | 5/2016 | Kanayama | G05B 13/02 307/116 |
| 2016/0157015 A1 | * | 6/2016 | Van Schyndel | H04R 3/007 381/55 |

* cited by examiner

*Primary Examiner* — Vivian C Chin
*Assistant Examiner* — Con P Tran

(57) ABSTRACT

One general aspect includes a method for electric overcurrent protection, the method including: calculating, via a controller, a system electric current sum; receiving, via the controller, audio production electric current data; comparing, via the controller, the system electric current sum and audio production electric current data; and when the audio production electric current data exceeds the system electric current sum, invoke a fail-soft action configured to prevent electric overcurrent from being delivered to an audio speaker.

20 Claims, 3 Drawing Sheets

ELECTRIC OVERCURRENT PROTECTION SYSTEM AND METHOD

INTRODUCTION

Audio systems can be limited in their diagnostic testing capabilities, which can thus result in a lack of fault detection and an inability to take a fail-soft action when electric overcurrent is delivered. As a result, in extreme cases, such electric overcurrent delivery can damage one or more of the audio system's speakers. However, diagnostic testing conducted outside of the system's speaker (i.e., via the power IC) can be conducted without similar limitations to the diagnostic testing capabilities. It is therefore desirable to provide a system and method that can carryout diagnostics testing outside of the speaker so as to ensure fail-soft action occurs when electric overcurrent is delivered to the audio system.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for electric overcurrent protection, the method including: calculating, via a controller, a system electric current sum; receiving, via the controller, audio production electric current data; comparing, via the controller, the system electric current sum and audio production electric current data; and when the audio production electric current data exceeds the system electric current sum, invoke a fail-soft action configured to prevent electric overcurrent from being delivered to an audio speaker. Other embodiments of this aspect include corresponding computer systems, apparatus, and computer programs recorded on one or more computer storage devices, each configured to perform the actions of the methods.

Implementations may include one or more of the following features. The method further including executing a retry strategy to reduce an activation time period for the fail-soft action. The method further including invoking, via the controller, a system manager to support the fail-soft action. The method where the system electric current sum includes the combination of a calculated per channel audio electric current and an idle electric current. The method where the per channel audio electric current is supported by one or more signals provided by one or more non-audio inputs. The method where the system electric current sum includes the combination of a calculated per channel audio electric current, an idle electric current, and one or more fixed-current thresholds. The method where: the fail-soft action can be one of a level one (1) fail-soft, level two (2) fail-soft, or level three (3) fail-soft; where the level one (1) fail-soft is configured to reduce the level of the audio signal being delivered to the audio speaker by a predetermined amount; where the level two (2) fail-soft is configured to block audio signals being delivered from one or more non-audio inputs; and where the level three (3) fail-soft is configured to remove all power delivered to an audio production device of the audio speaker. Implementations of the described techniques may include hardware, a method or process, or computer software on a computer-accessible medium.

One general aspect includes a system for electric overcurrent protection, the system including: a memory configured to include one or more executable instructions; a controller configured to execute the executable instructions; where the executable instructions enable the controller to: calculate a system electric current sum, receive audio production electric current data, compare the system electric current sum and audio production electric current data; and when the audio production electric current data exceeds the system electric current sum, invoke a fail-soft action configured to prevent electric overcurrent from being delivered to an audio speaker. Other embodiments of this aspect include corresponding computer systems, apparatus, and computer programs recorded on one or more computer storage devices, each configured to perform the actions of the methods.

Implementations may include one or more of the following features. The system where the executable instructions further enable the controller to execute a retry strategy to reduce an activation time period for the fail-soft action. The system where the executable instructions further enable the controller to invoke a system manager to support the fail-soft action. The system where the system electric current sum includes the combination of a calculated per channel audio electric current and an idle electric current. The system where the per channel audio electric current is supported by one or more signals provided by one or more non-audio inputs. The system where the system electric current sum includes the combination of a calculated per channel audio electric current, an idle electric current, and one or more fixed-current thresholds. The system where: the fail-soft action can be one of a level one (1) fail-soft, level two (2) fail-soft, or level three (3) fail-soft; where the level one (1) fail-soft is configured to reduce the level of the audio signal being delivered to the audio speaker by a predetermined amount; where the level two (2) fail-soft is configured to block audio signals from one or more non-audio inputs; and where the level three (3) fail-soft is configured to remove all power delivered to an audio production device of the audio speaker. Implementations of the described techniques may include hardware, a method or process, or computer software on a computer-accessible medium.

One general aspect includes a non-transitory and machine-readable medium having stored thereon executable instructions adapted to enable electric overcurrent protection, which when provided to a controller and executed thereby, causes the controller to: calculate a system electric current sum; receive audio production electric current data; compare the system electric current sum and audio production electric current data; and when the audio production electric current data exceeds the system electric current sum, invoke a fail-soft action configured to prevent electric overcurrent from being delivered to an audio speaker. Other embodiments of this aspect include corresponding computer systems, apparatus, and computer programs recorded on one or more computer storage devices, each configured to perform the actions of the methods.

Implementations may include one or more of the following features. The non-transitory and machine-readable memory execute a retry strategy to reduce an activation time period for the fail-soft action. The non-transitory and machine-readable memory where the system electric current sum includes the combination of a calculated per channel audio electric current and an idle electric current. The non-transitory and machine-readable memory where the per channel audio electric current is supported by one or more signals provided by one or more non-audio inputs. The non-transitory and machine-readable memory where the system electric current sum includes the combination of a calculated per channel audio electric current, an idle electric current, and one or more fixed-current thresholds. The non-transitory and machine-readable memory where: the fail-soft action can be one of a level one (1) fail-soft, level two (2) fail-soft, or level three (3) fail-soft; where the level one (1) fail-soft is configured to reduce the level of the audio signal being delivered to the audio speaker by a predetermined amount; where the level two (2) fail-soft is configured to block audio signals from one or more non-audio inputs; and where the level three (3) fail-soft is configured to remove all power delivered to an audio production device of the audio speaker. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiment(s). As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
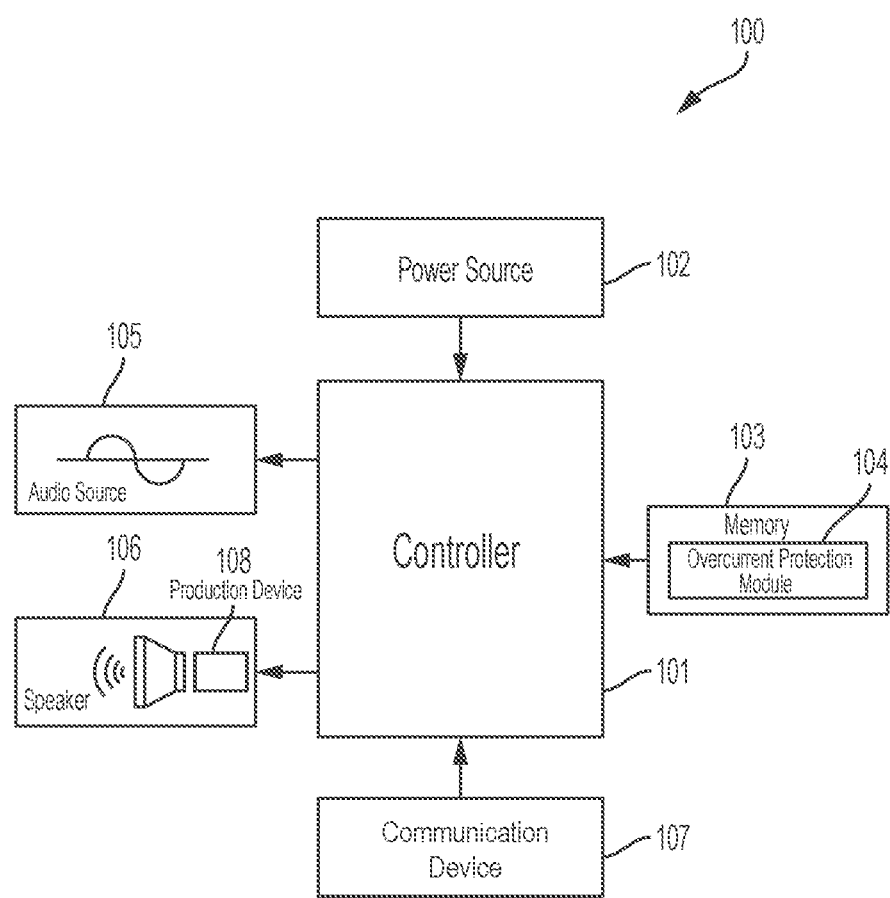
FIG. 1 shows an exemplary block diagram of an exemplary embodiment of a system for electric overcurrent protection.

Referring to the drawings in detail, and specifically to FIG. 1, a block diagram of an exemplary system to protect against electric overcurrent in an audio speaker is generally indicated by reference numeral 100. As shown, the disclosed audio system 100 includes a controller 101, a power supply 102, a memory 103, overcurrent protection module 104, an audio source 105, an audio speaker 106 incorporating an audio production device 108, and a communication device 107. However, system 100 is not limited to the aforementioned configuration and may be configured to include additional exemplary elements and/or omit one or more of the aforementioned exemplary elements. It should also be understood that, although they appear to be separately located from each other, skilled artists will see that certain components of audio system 100 may be incorporated into one or more other components. For example, memory 103 (and thus overcurrent protection module 104, discussed below) may be installed into the controller 101.

Controller 101 can, in one or more embodiments, be located in an audio device such as, but not limited to, a radio, MP3 player, amplifier, etc. (and, in one or more embodiments, may be installed in a vehicle) and controller 101 essentially controls the overall operation and function of system 100. Upon reading and executing one or more executable instructions, controller 101 may control, send, and/or receive information from one or more of memory 103, overcurrent protection module 104, audio source 105, audio speaker 106 (or audio production device 108), and communication device 107. The controller 101 may include one or more from among a processor, a microprocessor, a central processing unit (CPU), a graphics processor, Application Specific Integrated Circuits (ASICs), Power Integrated Circuit (IC), Field-Programmable Gate Arrays (FPGAs), state machines, and a combination of hardware, software and firmware components.

Power supply 102 provides power to one or more of the controller 101, memory 103, audio source 105, audio speaker 106 (and can be via the audio production device 108), and communication device 107. The power supply 102 may include one or more from a battery, an outlet, a capacitor, a solar energy cell, a generator, a wind energy device, an alternator, etc.

Memory 103 can, in one or more embodiments, be located in the audio device or, in one or more embodiments, controller 101 and is configured for recording information, storing information, and retrieving information used by audio system 100. Memory 103 may include the executable instructions configured to be read and executed by controller 101 so as to perform the functions of system 100. Memory 103 may also be controlled by controller 101 to record, store, and retrieve various types of data in databases such as, but not limited to, storing and retrieving data in an overcurrent protection module 104.

Memory 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electricly Erasable Programmable Read Only Memories), magnetic or optical cards, flash memory, cache memory, and other type of media/machine-readable medium suitable for storing machine-executable instructions.

The overcurrent protection module 104 can be software stored in memory 103 and may act to reduce the likelihood of an audio electric overcurrent situation which could result in a catastrophic result for audio speaker 106 and/or audio production device 108. Overcurrent protection module 104 moreover allows for safe issue resolution by calculating a system electric current sum from audio source 105 and then correlates this electric current to the electric current consumption of audio speaker 106 (via audio production device 108). For example, protection module 104 determines an electric overcurrent event occurs when audio speaker electric current consumption exceeds the system electric current sum. Moreover, in response to an electric overcurrent event, in one or more embodiments, protection module 104 will invoke one or more triggerable fail-soft actions (i.e., graceful degradation techniques) to terminate nonessential processes when an electric overcurrent event occurs.

Audio source 105 can include an audio-signal-production device such as a radio configured to provide AM, FM, media streaming services (e.g., PANDORA RADIO™, SPOTIFY™, etc.) as well as satellite radio. Audio source 105 may also be a CD player, DVD player, MP3 player, and/or a device configured to play some other type of multimedia player, or audio source 105 may microphone. Moreover, audio source 105 is designed to produce an audio signal that drives at least one audio output by an audio speaker 106.

Audio speaker 106 can be one or more stereo speakers that may provide the audio output as sound to one or more vehicle passengers and can be a dedicated, stand-alone device or part of the vehicle. For example, speaker 106 can be an external and/or portable sound generating device or the speaker can be integrated into a portable version of audio source 105. Alternatively, the speaker 106 may be integrated in the vehicle as a series of mounted speakers. Audio speaker 106 also includes audio production device 108 to reproduce the audio signal from audio source 105 at a level strong enough to drive the speaker to produce the proper audio output. As such, the audio production device 108 can be embodied as an operational amplifier, transistor, or power IC externally installed on or internally installed in audio speaker 106.

Communication device 107 may be used by system 100 to communicate with various types of external, remote parties. Communication device 107 may be used to send/receive certain communications such as, but not limited to, executable instructions/executable instruction updates for the protection module 104 (e.g., software/software updates). These communications may be sent to remote parties such as, but not limited to, a call center, a computing device, or a mobile computing device. New or developed recognition module data, executable instructions, and image database updates may also be downloaded from the call center, one or more computing devices, or one or more mobile computing devices via communication device 107.

The communication device 107 may include various peripheral communication modules of executable instructions. Such modules may include, but are not limited to, a GPS module, a broadcast receiving module, a near field communication (NFC) module, a wired communication module, and a wireless communication module. The broadcast receiving module may include a terrestrial broadcast receiving module including an antenna to receive a terrestrial broadcast signal, a demodulator, and an equalizer. The NFC module is a module that communicates with an external apparatus located at a nearby distance according to an NFC method. The GPS module is a module that receives a GPS signal from one or more GPS satellites of a satellite constellation and detects an electric current location. The wired communication module may be a module that receives information over a wired network such as a local area network, a controller area network (CAN), or an external network, via Ethernet cable, fiber optic cable, coaxial cable, etc. The wireless communication module is a module that is connected to an external network by using a wireless communication protocol such as Wi-Fi or IEEE communication protocol and communicates with the external network. The wireless communication module may further include a mobile communication module that accesses a mobile communication network and performs communication according to various mobile communication standards such as 4th generation (4G), 3rd generation partnership project (3GPP), long term evolution (LTE), Bluetooth, Bluetooth Low Energy (BLE), or ZigBee. Skilled artisans will understand that communication device 110 may use one or more of these peripheral modules (or other modules not discussed herein) to send/receive the developed topographical data.

Figure 2:
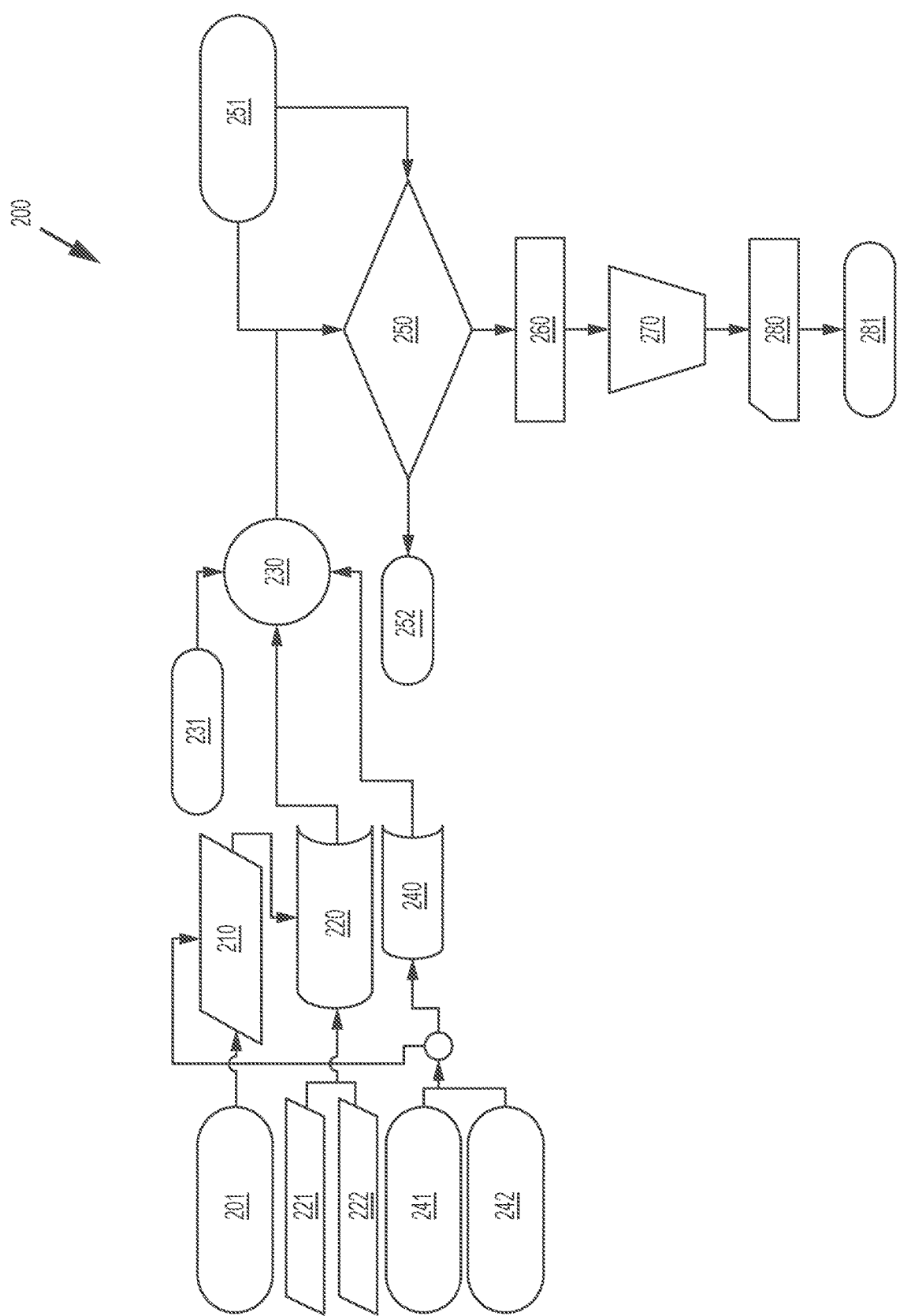
FIG. 2 shows an exemplary flow chart of an exemplary method for electric overcurrent protection.

Turning now to FIG. 2, there can be seen a method 200 to illustrate audio electric overcurrent protection as carried out by overcurrent protection module 104 (discussed above). Ancillary aspects of method 200 may moreover be carried out by speaker 106 and audio production device 108. Method 200 begins at 201 in which the real-time audio signal from the audio source 105 is delivered to memory 103 and protection module 104 (via controller 101). This audio signal may, for example, be an analog signal which is representative of sound and be provided in voltage (e.g., 20 millivolts) as a function of frequency (i.e., in the range of approximately 20 to 20,000 Hz). In step 210, from this audio signal, protection module 104 calculates the power spectral density for the audio signal. In one or more embodiments, power spectral density calculation may be supported by the addition of signals from non-audio inputs provided to protection module 104—such as, amongst other non-audio inputs, for example, the vehicle's chime request 241 and noise management input 242. Skilled artisans will see this power spectral density can describe the energy of the audio signal as a function of frequency and can be expressed in watts per hertz (W/Hz) (or dB per Hertz) and that calculating the power spectral density from an audio signal is well known.

The vehicle's chime request input 241 delivers signals produced from a chime module (not shown) generally known to be installed in the vehicle as an electronic device (a vehicle system module (VSM)) or, alternatively, software stored as software on memory 103 (or some other memory device beyond the parameters of audio system 100) or some other external audio device. Moreover, the chime module is adapted to produce one or more notification chimes designed to alert a vehicle user/operator of various vehicle settings, operations, and/or conditions (e.g., to alert a vehicle user a key is in the ignition when the vehicle has been turned off, when one of the vehicle doors is ajar, etc.). The noise management input 242 delivers signals produced from an active sound management module (noise management module) generally known to be installed in the vehicle as an electronic device or, alternatively, stored as software on memory 103 (or some other memory device beyond the parameters of audio system 100) or some other external audio device. Moreover, the active sound management module (not shown) is designed to transmit audio signals into the vehicle's cabin to alter vehicle powertrain-related sounds within the cabin. For example, noise management module can produce active noise cancellation (ANC) techniques known to reduce unwanted sound in the cabin of the vehicle by producing a second sound specifically designed to cancel the first (i.e., via speaker 106). In an additional example, noise management module can enhance natural engine sounds by producing synthesized engine sounds adapted to be played in the vehicle cabin (i.e., via speaker 106).

In step 220, the power spectral density of the audio signal is fed into an electric current Correlation Tuning Coefficient that may, for example, be a lookup table ("current correlation database"). In addition, the electric current correlation database uses the power spectral density along with the number of channels 221 that are present at speaker 106 (i.e., to produce stereophonic sound and the like) and the speaker impedance 222 of the speaker 106 to provide the real-time audio signal electric current expected for each established channel of speaker 106 ("per channel audio electric current"). In essence, the power spectral density with number of channels are plugged into the table and a corresponding value for the expected real-time audio electric current per each established channel is produced from the electric current correlation database. Also in various embodiments, the electric current correlation database is stored in the memory 103 as stored values thereof, and is automatically retrieved by the controller 101 during step 220.

In step 230, in one or more embodiments, an idle electric current (amp-base electric current) 231 is added to the per channel audio electric current to create a system electric current sum. The idle electric current 231 represents the fixed-value idle electric current drawn by controller 101 during processing of protection module 104 (e.g., 0.2 mA). Moreover, in those embodiments in which the power spectral density calculation has not been supported by the non-audio inputs, fixed-current thresholds 240 may be further added to the system electric current sum (i.e., the combination idle electric current and per channel audio electric current). The fixed-current thresholds 240 are established fixed value settings for each of the non-audio source inputs (i.e., the vehicle's chime request 241 and noise management input 242), which are based on development testing and calibration. Also in various embodiments, the fixed-current thresholds 240 are stored in the memory 103 as stored values thereof, and is automatically retrieved by the controller 101 during step 240. For example, if the largest amount of electric current that could be delivered by noise management input 242 is calculated to be 0.5 A, then a fixed electric current of 0.5 A would be added to the system electric current sum, at step 230. It should be understood, however, that when fixed-current thresholds are added to the system electric current sum in step 230, these inputs would not also be added to the power spectral density calculation would at step 210. As follows, the non-audio inputs may be directly added to the calculation of the system electric current sum or indirectly support the system electric current sum via the power spectral density.

After the per channel audio electric current and idle electric current 231, or combination per channel audio electric current, idle electric current 231 and fixed-current thresholds 240 (depending on the embodiment) are added together to create a system electric current sum, in step 230 method 200 moves to step 250. In step 250, the electric current over expected is detected. In this step, in particular, the system electric current sum is compared to the audio production electric current data that has been provided as an output diagnostic 251 from audio production device 108 (i.e., the real-time/actual electric current from audio speaker 106, which, for example, may be the inter-integrated circuit (I2C) data). Alternatively, in one or more embodiments, the audio production electric current data could be provided to protection module 104 by an external monitoring circuit through an analog-to-digital converter input (A/D input). When the audio production electric current data is less than or equal to the system electric current sum, then method 200 moves to completion 252 and no action will be taken. However, if the audio production electric current data is greater than the sum of the per channel electric current and amp base electric current 231, then method 200 will move to step 260.

Figure 3A:
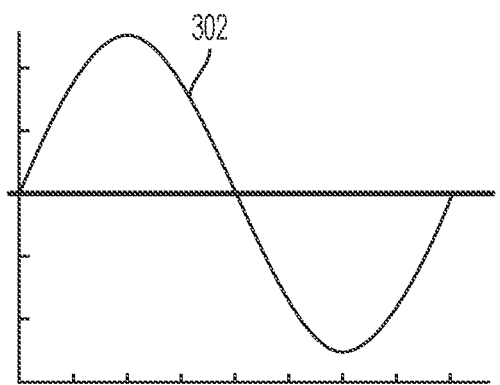
FIG. 3A graphically represents an exemplary system electric current sum signal delivered to an audio speaker.
Figure 3B:
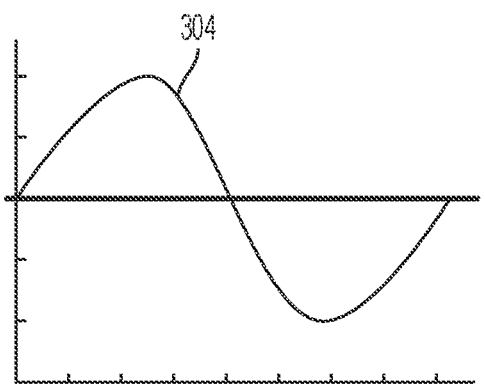
FIG. 3B graphically represents the exemplary system electric current sum signal delivered to the audio speaker after a level one (1) fail-soft activation.
Figure 3C:
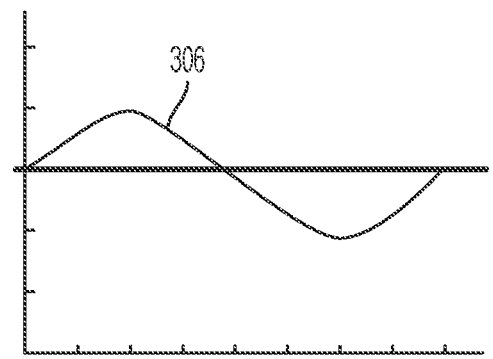
FIG. 3C graphically represents the exemplary system electric current sum signal delivered to the audio speaker after a level two (2) fail-soft activation.
Figure 3D:
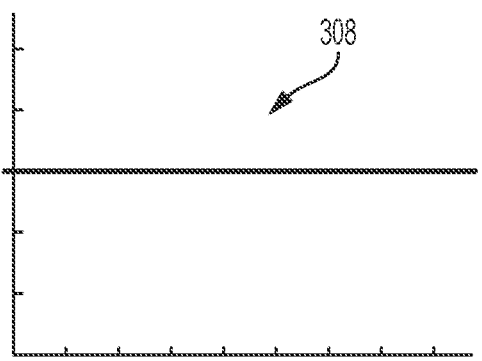
FIG. 3D graphically represents the exemplary system electric current sum signal delivered to the audio speaker after a level three (3) fail-soft activation.

In step 260, protection module 104 further analyzes the amount in which the audio production electric current data exceeds the system electric current sum as well as the duration of this failure to determine whether and which fail-soft action (i.e., which level of fail-soft) should be implemented as a remedy to prevent electric overcurrent (i.e., a hazardous amount of electric current) from being delivered to the speaker 106, which can potentially cause damage to the speaker 106. Moreover, a lookup table containing calibrated time and electric current thresholds can be accessed to support the determination of which fail-soft mechanism is to be invoked. For example, when the signal of the audio production electric current data is 10% over the system electric current sum for thirty (30) seconds, a level one (1) fail-soft can be invoked. Furthermore, with further reference to FIG. 3A in view of FIG. 3B, upon being invoked, this level one (1) fail-soft can reduce the strength of the audio signal of the system electric current sum 302 (FIG. 3A) by a predetermined amount (e.g., a 10 dB reduction) such that the signal strength delivered to speaker 304 will result in a lower peak electric current and thus lowered sound pressure level (SPL) delivered to the speakers of speaker 106. Alternatively, with further reference to FIG. 3A in view of FIG. 3C, when the audio production electric current is 20% over the signal 302 of system electric current sum for 100 seconds, a level two (2) fail-soft can be invoked and this fail-soft mechanism can block (i.e., mute) the audio signals being delivered from noise management input 242 so that none can be provided to speaker 106. As such, this fail-soft action will result in a substantial level reduction of the audio signal peak electric current 306 delivered to audio speaker 106—for example a reduction of 25 dB). Finally, when the audio production electric current is 30% over the system electric current sum 302 for 300 seconds, a level three (3) fail-soft can be invoked. As a result, with further reference to FIG. 3A in view of FIG. 3D, fail-soft level three (3) can cause controller 101 to cut off all power being delivered to audio production device 108 and thus remove all power across speaker 106 from power source 102, such that no audio signal 308 can be delivered (i.e., to deactivate speaker 106). It should be understood that these fail-soft invocation thresholds are exemplary and the lookup table may contain other calibrated time and electric current thresholds to invoke one or more of the fail-soft actions.

In optional step 270, a system manager 270 may be invoked to manage various aspects of system 100 (e.g., the audio source, the chime module, noise management module, or any other VSMs) to support the fail-soft actions in preventing electric overcurrent from being delivered to the speaker 106. For example, if a level two (2) fail-soft has been invoked, system manager 270 will be triggered and can disable the noise management module and/or chime module and thus no signal will be produced from noise management input 242 and/or chime request input 241. It should be understood that in those embodiments in which the noise management module and chime module are electronic devices installed in the vehicle, disablement for each may occur by the system manager 270 causing power source 102 to remove power from one or both of the modules, which may occur via communications with the body control module (BCM—not shown) and/or electronic control unit (ECU—not shown) of the vehicle. However, when the noise management module and chime module are software modules stored on memory 103, system manager 270 will cause controller 101 to simply disable one or both modules by ceasing to generate and read their signals. In an additional example, if a level three (3) fail-soft has been invoked, the system manager 270 will be triggered and can notify the BCM/ECU to restrict the vehicle from being able to operate speaker 106 or to disable speaker 106 by stopping power from being delivered by power supply 102.

In optional step 280, a retry strategy module 280 may be executed to reduce the activation time period for an invoked fail-soft action (i.e., to reduce the likelihood the invoked fail-soft action will be longer than desirable). For instance, if a level one (1) fail-soft has been invoked, the system manager may request system electric current sum be compared to the audio production electric current data (i.e., the audio production electric current data) every thirty (30) seconds (i.e., in 30 second intervals) so as to ensure the sound audio level may be returned to its true level as early as possible. If a level two (2) fail-soft has been invoked, system manager 280 may request the system electric current sum be compared to the audio production electric current data every five (5) minutes (i.e., in 5-minute intervals) so as to ensure noise management module can be restarted as quickly as possible. However, for example, when fail-soft level three (3) is invoked, the system manager 290 could request a retry every ten (10) minutes to ensure the smallest likelihood of missing the activation of system features such as, for example, an auditory chime produced by the chime module. After optional step 280, method 200 moves to completion 281.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A method for electric overcurrent protection, the method comprising:
   calculating, via a controller, a system electric current sum;
   receiving, via the controller, audio production electric current data;
   comparing, via the controller, the system electric current sum and the audio production electric current data; and
   when the audio production electric current data exceeds the system electric current sum, invoke a fail-soft action configured to prevent electric overcurrent from being delivered to an audio speaker.

2. The method of claim 1, further comprising executing a retry strategy to reduce an activation time period for the fail-soft action.

3. The method of claim 1, further comprising invoking, via the controller, a system manager to support the fail-soft action.

4. The method of claim 1, wherein the system electric current sum comprises a combination of a calculated per channel audio electric current and an idle electric current.

5. The method of claim 4, wherein the per channel audio electric current is supported by one or more signals provided by one or more non-audio inputs.

6. The method of claim 1, wherein the system electric current sum comprises a combination of a calculated per channel audio electric current, an idle electric current, and one or more fixed-current thresholds.

7. The method of claim 1, wherein:
   the fail-soft action can be one of a level one (1) fail-soft, level two (2) fail-soft, or level three (3) fail-soft;
   wherein the level one (1) fail-soft is configured to reduce a level of an audio signal being delivered to the audio speaker by a predetermined amount;
   wherein the level two (2) fail-soft is configured to block audio signals being delivered from one or more non-audio inputs; and
   wherein the level three (3) fail-soft is configured to remove all power delivered to an audio production device of the audio speaker.

8. A system for electric overcurrent protection, the system comprising:
   a memory configured to comprise one or more executable instructions;
   a controller configured to execute the one or more executable instructions;
   wherein the one or more executable instructions enable the controller to:
   calculate a system electric current sum;
   receive audio production electric current data;
   compare the system electric current sum and the audio production electric current data; and
   when the audio production electric current data exceeds the system electric current sum, invoke a fail-soft action configured to prevent electric overcurrent from being delivered to an audio speaker.

9. The system of claim 8, wherein the one or more executable instructions further enable the controller to execute a retry strategy to reduce an activation time period for the fail-soft action.

10. The system of claim 8, wherein the one or more executable instructions further enable the controller to invoke a system manager to support the fail-soft action.

11. The system of claim 8, wherein the system electric current sum comprises a combination of a calculated per channel audio electric current and an idle electric current.

12. The system of claim 11, wherein the per channel audio electric current is supported by one or more signals provided by one or more non-audio inputs.

13. The system of claim 8, wherein the system electric current sum comprises a combination of a calculated per channel audio electric current, an idle electric current, and one or more fixed-current thresholds.

14. The system of claim 8, wherein:
the fail-soft action can be one of a level one (1) fail-soft, level two (2) fail-soft, or level three (3) fail-soft;
wherein the level one (1) fail-soft is configured to reduce a level of an audio signal being delivered to the audio speaker by a predetermined amount;
wherein the level two (2) fail-soft is configured to block audio signals from one or more non-audio inputs; and
wherein the level three (3) fail-soft is configured to remove all power delivered to an audio production device of the audio speaker.

15. A non-transitory and machine-readable medium having stored thereon executable instructions adapted to enable electric overcurrent protection, which when provided to a controller and executed thereby, causes the controller to:
calculate a system electric current sum;
receive audio production electric current data;
compare the system electric current sum and the audio production electric current data; and
when the audio production electric current data exceeds the system electric current sum, invoke a fail-soft action configured to prevent electric overcurrent from being delivered to an audio speaker.

16. The non-transitory and machine-readable memory of claim 15, execute a retry strategy to reduce an activation time period for the fail-soft action.

17. The non-transitory and machine-readable memory of claim 15, wherein the system electric current sum comprises a combination of a calculated per channel audio electric current and an idle electric current.

18. The non-transitory and machine-readable memory of claim 17, wherein the per channel audio electric current is supported by one or more signals provided by one or more non-audio inputs.

19. The non-transitory and machine-readable memory of claim 15, wherein the system electric current sum comprises a combination of a calculated per channel audio electric current, an idle electric current, and one or more fixed-current thresholds.

20. The non-transitory and machine-readable memory of claim 15, wherein:
the fail-soft action can be one of a level one (1) fail-soft, level two (2) fail-soft, or level three (3) fail-soft;
wherein the level one (1) fail-soft is configured to reduce a level of an audio signal being delivered to the audio speaker by a predetermined amount;
wherein the level two (2) fail-soft is configured to block audio signals from one or more non-audio inputs; and
wherein the level three (3) fail-soft is configured to remove all power delivered to an audio production device of the audio speaker.

\* \* \* \* \*